(12) United States Patent
Arsovski et al.

(10) Patent No.: US 8,077,534 B2
(45) Date of Patent: Dec. 13, 2011

(54) ADAPTIVE NOISE SUPPRESSION USING A NOISE LOOK-UP TABLE

(75) Inventors: Igor Arsovski, Williston, VT (US); Hayden C. Cranford, Jr., Cary, NC (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 12/183,099

(22) Filed: Jul. 31, 2008

(65) Prior Publication Data

US 2010/0031067 A1 Feb. 4, 2010

(51) Int. Cl.
*G11C 7/02* (2006.01)
(52) U.S. Cl. .......................................... 365/206; 365/49
(58) Field of Classification Search .................. 365/206, 365/49, 189.09
See application file for complete search history.

(56) References Cited

U.S. PATENT DOCUMENTS

| | | | |
|---|---|---|---|
| 6,081,822 A | 6/2000 | Hillery et al. | |
| 6,473,124 B1 | 10/2002 | Panicacci et al. | |
| 6,493,830 B2 | 12/2002 | Kamei | |
| 6,493,853 B1 | 12/2002 | Savithri et al. | |
| 6,563,727 B1 | 5/2003 | Roth et al. | |
| 6,603,293 B2 | 8/2003 | Knoedgen | |
| 6,654,054 B1 | 11/2003 | Embler | |
| 6,803,953 B2 | 10/2004 | Wada | |
| 6,807,656 B1 | 10/2004 | Cao et al. | |
| 6,839,258 B2 | 1/2005 | Patel | |
| 7,218,135 B2 * | 5/2007 | Arsovski et al. | 326/26 |
| 2003/0202395 A1 | 10/2003 | Lee et al. | |

OTHER PUBLICATIONS

"Circuit and Microarchitectural Techniques for Reducing Cache Leakage Power," by Nam Sung Kim, Krisztian Flaunter, David Blaauw, and Trevor Mudge. IEEE Transactions on Very Large Scale Integration (VLSI) Systems, vol. 12, No. 2, Feb. 2004, pp. 167-184.
"Drowsy Instruction Caches, Leakage Power Reduction Using Dynamic Voltage Scaling and Cache Sub-bank Prediction," by Nam Sung Kim, Krisztian Flaunter, David Blaauw, and Trevor Mudge. Proceedings of the 35th Annual IEEE/ACM International Symposium on Microarchitecture (MICRO-35), 2002.
"Integrating Adaptive On-Chip Storage Structures for Reduced Dynamic Power," by Steve Dropsho, Alper Buyuktosunoglu, Rajeev Balasubramonnian, David H. Albonesi, Sandhya Dwarkadas, Greg Semeraro, Grigorios Magklis, and Michael L. Scott. Proceedings of the 2002 International Conference on Parallel Architectures and Compilation Techniques (PACT '02), 2002.
"Efficient Entry-Reduction Algorithm for TCAM-Based IP Forwarding Engine," by P.C. Wang, C.T. Chan, R.C. Chen, and H.Y. Chang. IEE Proc.-Commun., vol. 152, No. 2, Apr. 2005, pp. 172-176.

* cited by examiner

*Primary Examiner* — Son Dinh
(74) *Attorney, Agent, or Firm* — Downs Rachlin Martin PLLC

(57) ABSTRACT

A proactive noise suppression system and method for a power supply network of an integrated circuit. The system and method include receiving an IC event sequence to a memory element, correlating the IC event sequence to a storage location in a second memory element, the storage location including an anti-noise response signature, and utilizing the anti-noise response signature to proactively generate an anti-noise response in a power supply network in at least a portion of the integrated circuit at about the time of execution of the first IC event sequence. Anti-noise response signatures may be adaptively updated and/or created based on noise measurements made corresponding to execution of an IC event sequence by the integrated circuit.

20 Claims, 5 Drawing Sheets

ADAPTIVE NOISE SUPPRESSION USING A NOISE LOOK-UP TABLE

FIELD OF THE DISCLOSURE

The present disclosure generally relates to the field of noise suppression in integrated circuits. In particular, the present disclosure is directed to adaptive noise suppression using a noise look-up table.

BACKGROUND OF THE INVENTION

In an integrated circuit, noise events can significantly effect the performance and/or function of the integrated circuit (IC) design. In particular, as integrated circuits scale smaller and smaller, circuitry is becoming farther away from the external power supplies. Additionally, as integrated circuits scale, there is higher current density and, thus, the integrated circuits sink larger amounts of current in smaller areas. In an attempt to overcome noise problems, current designs may utilize reactive noise suppression techniques, such as modulating the frequency, adding additional decoupling capacitors, and/or increasing the overhead of the power tree, in an attempt to passively address the noise issue. These reactive noise suppression techniques are not effective and, thus, it may be beneficial to develop improved methods of dealing with noise issues in integrated circuits.

BRIEF SUMMARY OF THE INVENTION

In one embodiment, a noise suppression method for a power supply network of an integrated circuit capable of executing one or more IC event sequences is provided. The method includes receiving a first IC event sequence to a CAM memory element; correlating the first IC event sequence to a storage location in a second memory element, the storage location including an anti-noise response signature, said correlating occurring in about one clock cycle or less of the integrated circuit; outputting the anti-noise response signature; and utilizing the anti-noise response signature to generate an anti-noise response in a power supply network in at least a portion of the integrated circuit at about the time of execution of the first IC event sequence.

In another embodiment, a noise suppression system for a power supply network of an integrated circuit capable of executing one or more IC event sequences is provided. The system includes an integrated circuit event input for receiving a first IC event sequence to the integrated circuit; a first memory having one or more storage locations, each of said one or more storage locations configured to store a corresponding respective one of a first set of anti-noise response signatures, each of the first set of anti-noise response signatures corresponding to an anti-noise response associated with at least one of the one or more IC event sequences; a second memory configured to store a second set of correlations between the one or more IC event sequences and said one or more storage locations, said second memory being in communication with said integrated circuit event input for receiving the first IC event sequence and searching said second set of correlations for a first location of said one or more storage locations that includes a first anti-noise response signature corresponding to the first IC event sequence, said first memory using the first location to output the first anti-noise response signature; and an anti-noise generator in communication with said first memory for receiving the first anti-noise response signature from said first memory, said anti-noise generator generating an anti-noise response from the first anti-noise response signature in at least a portion of the power supply network at about the same time of execution of the first IC event sequence by the integrated circuit.

In yet another embodiment, a noise suppression system for a power supply network of an integrated circuit capable of executing one or more IC event sequences is provided. The system includes an integrated circuit event input for receiving a first IC event sequence to the integrated circuit; a first memory having one or more storage locations, each of said one or more storage locations configured to store a corresponding respective one of a first set of anti-noise response signatures, each of the first set of anti-noise response signatures corresponding to an anti-noise response associated with at least one of the one or more IC event sequences; a second memory including a set of correlations between the one or more IC event sequences and said one or more storage locations, said second memory capable of receiving said first IC event sequence and outputting to said first memory an indication of a first storage location of said one or more storage locations that corresponds to the first IC event sequence, said outputting occurring within two clock cycles of the integrated circuit from the receiving of first IC event sequence by said first memory; and an anti-noise generator in communication with said first memory for receiving a first anti-noise response signature from said first memory, the first anti-noise response signature associated with said first storage location, said anti-noise generator generating an anti-noise response from the first anti-noise response signature in at least a portion of the power supply network at about the same time of execution of the first IC event sequence by the integrated circuit.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

In one embodiment, the present disclosure includes a noise suppression system for a power supply network of an integrated circuit. The noise suppression system includes an input for receiving IC event sequences, a first memory that includes a set of anti-noise response signatures that correspond to the respective IC event sequences, a second memory that correlates the IC event sequences to the respective anti-noise response signatures that are stored in the first memory, and an anti-noise generator for receiving an anti-noise response signatures and generating anti-noise response in the power supply network at about the time that the corresponding IC event sequence is executed in the integrated circuit. In one exemplary aspect, applying an anti-noise response to an area of an IC at about the same time that an event occurs that is known to likely produce a certain level of noise, the noise can be proactively addressed by the corresponding anti-noise response without the need to reactively deal with the noise.

Figure 1:
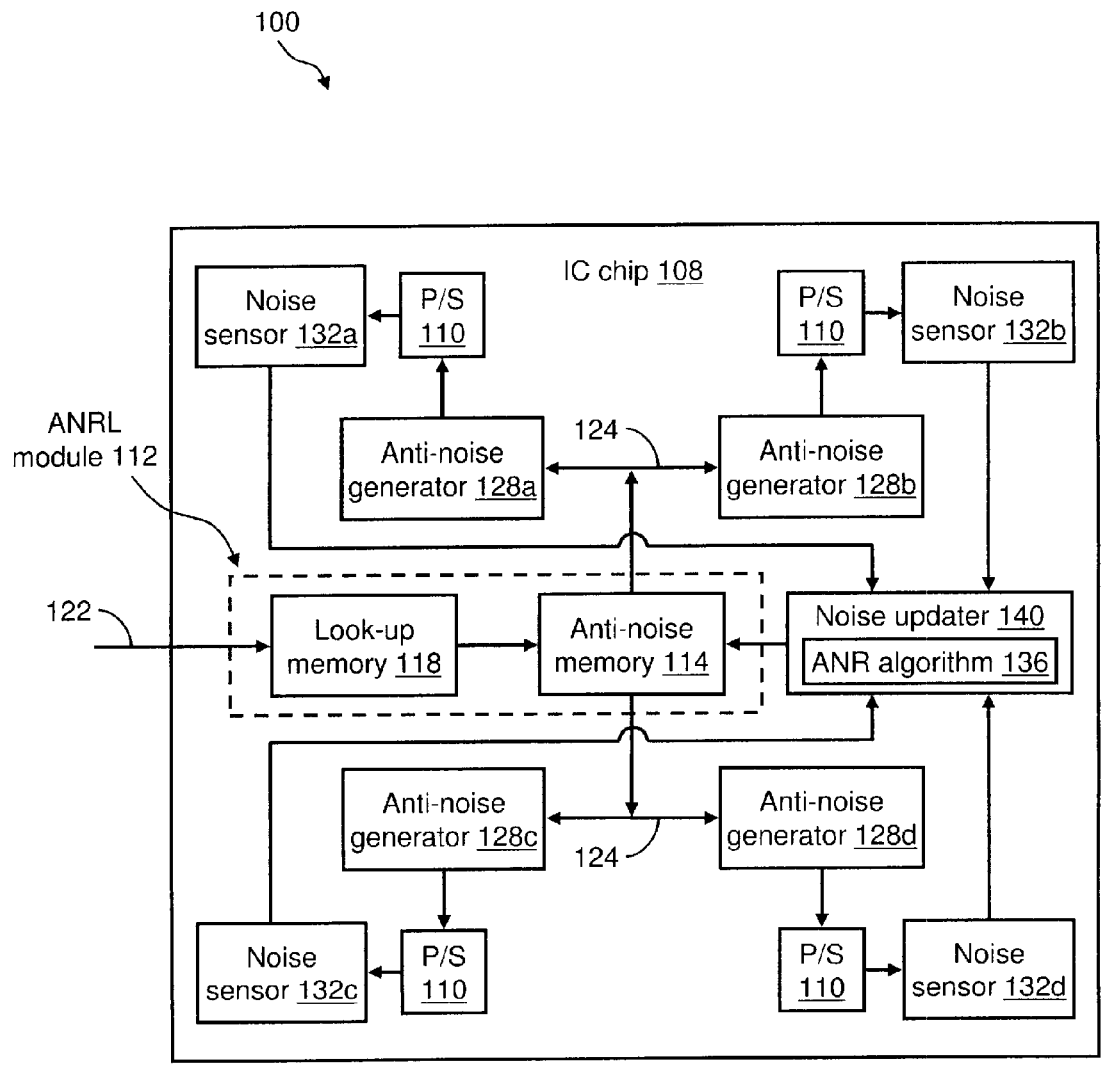
FIG. 1 illustrates a high-level block diagram of an example of a noise suppression system for use with an integrated circuit.

FIG. 1 illustrates a high-level block diagram of one implementation of a noise suppression system 100 for use in an integrated circuit. As is shown in FIG. 1, suppression system 100 may be included in an IC chip 108. Suppression system 100 is utilized in conjunction with an integrated circuit power supply (P/S) network 110. P/S network 110 may include any one or more power supplies associated with the operation of IC chip 108. Examples of such power supplies include, but are not limited to, a core logic power supply, a Vdd power supply, a Vcc power supply, and any combinations thereof. In one example, P/S network 110 includes a power supply network for the core logic of IC chip 108. In another example, P/S 110 includes a Vdd power supply network of IC chip 108. In yet another example, P/S 110 includes a Vcc power supply network of IC chip 108. Various physical portions of a P/S network may experience noise events that are caused by logic operations that are executing at various physical locations, such as in a certain quadrant, of IC chip 108. In one exemplary operational aspect of suppression system 100, active and preemptive mechanisms for determining a power supply noise signature for each logic operation may be provided by system 100. System 100 may also generate a corresponding anti-noise response that may be applied to one or more portions of P/S 110, at a time and chip location that corresponds to the occurrence of the noise event (e.g., in order to substantially cancel out the noise and, thereby, maintain suitable performance and/or functionality of the IC design).

Suppression system 100 includes an anti-noise response look-up (ANRL) module 112 that further includes an anti-noise memory 114 and a look-up memory 118. ANRL module 112 is electrically connected to an event input 122 of IC 108. Event input 122 may be any input to a circuitry powered by (or located in proximity to) a power supply network associated with a noise suppression system, such as noise suppression system 100. Event input 122 detects (e.g., reads, taps into) one or more input sequences (e.g., a logic input, a data input) being delivered to the associated circuitry via event input 122. ANRL module 112 utilizes an input sequence to determine an appropriate anti-noise response to apply to an area of P/S network 110 to address, reduce and/or eliminate noise that may arise in that area of P/S network 110 by the execution of the input sequence by associated circuitry of IC 108.

Each IC input sequence (i.e., IC event) may include one or more bit combinations for execution by one or more circuit elements of IC chip 108. Event input 122 is in electrical communication with look-up memory 118, which is in electrical communication with anti-noise memory 114. Anti-noise memory 114 includes one or more storage locations, each for storing an anti-noise response signature. An anti-noise response signature includes information related to an anti-noise response that can be implemented on P/S network 110 to counteract noise that may be generated by an IC event. Information included in an anti-noise response signature may include, but is not limited to, time of execution of anti-noise response (e.g., in relation to receipt of an input sequence), amount of charge of an anti-noise response, physical location of an IC circuitry for an anti-noise response, and any combinations thereof. Different IC events may produce different noise when executed by circuitry of IC 108. Each IC event that may be executed on an IC may have a corresponding anti-noise response and associated anti-noise response signature. A variety of ways for determining an appropriate anti-noise response and correlated anti-noise response signature may be implemented. One exemplary way is discussed further below.

Look-up memory 118 includes correlations between an input sequence corresponding to an IC event and a storage location in anti-noise memory 114 in which an anti-noise response signature for the IC event is stored. Look-up memory 118 receives an input sequence and utilizes the input sequence to determine the location in anti-noise memory 114 of an associated anti-noise response signature. ANRL 112 utilizes the determined location to access anti-noise memory 114 to retrieve the associated anti-noise response signature.

Anti-noise memory 114 may be any volatile or non-volatile storage device, such as, but not limited to, a volatile or non-volatile static random access memory (SRAM) or dynamic random access memory (DRAM). The number of storage locations within anti-noise memory 114 may equate to the expected number of noise events and/or groups of like noise events that may occur within IC chip 108.

Look-up memory 118 may be any volatile or non-volatile storage device that has the capability to be searched rapidly. Examples of such a memory include, but are not limited to, a content addressable memory (CAM), a ternary CAM (TCAM), other memory that allows a fast search capability, and any combinations thereof. In one example, look-up memory 118 includes a volatile or non-volatile content addressable memory (CAM), which is a type of computer memory that may be used in certain high speed searching applications. For example, the contents of a CAM may be searched in as little as one clock cycle. In one such example, a CAM is designed such that a data word, such as via event input 122, may be supplied and the CAM searches its entire memory to determine whether the certain data word is stored at any location therein. If the data word is found, the CAM returns a list of one or more storage addresses at which the word is found. The data words of a binary CAM consist entirely of ones and zero. In another example, look-up memory 118 includes a ternary CAM (TCAM). In one exemplary aspect, a TCAM allows a third matching state of "X" or "Don't Care" for one or more bits in the stored data word, which adds flexibility to the search and provides the ability to map more than one input to a single output. In one such example, a TCAM may have a stored word of "10XX0" which matches any of the four search words 10000, 10010, 10100, and 10110, which in the context of noise suppression system may be an input sequence of four events having substantially the same noise signatures and requiring substantially the same anti-noise response signature.

Look-up memory 118 may include any number of entries for correlating an input sequence to a storage location of an anti-noise signature in anti-noise memory 114. In one example, each IC event for which there is a anti-noise signature stored in memory 114 includes an entry in look-up memory 118. In another example, one or more IC events may share the same anti-noise signature. In such an example, anti-noise memory 114 may store the anti-noise signature only once for corresponding to more than one IC event. Look-up memory 118 may then include a single entry that correlates multiple input sequences with the one location of the corresponding anti-noise signature for those multiple input sequences. A variety of compression techniques exist for reducing similar data items in a set to allow the set to include fewer data items. One such compression technique is utilized by network routers. Other compression algorithms may also be used. In one embodiment, look-up memory 118 may be compressed during a time that the integrated circuit is idle (e.g., input 122 is not receiving/detecting an input sequence).

Look-up memory 118 may be used as a look-up mechanism for rapidly associating a certain content of event input 122 with an impending noise event. In one example, depending on a certain event input 122, look-up memory 118 outputs a data word that addresses anti-noise memory 114, within which is stored the associated anti-noise response signature. In other words, the combination of anti-noise memory 114 and look-up memory 118 of ANRL module 112 is utilized to translate the input sequence of event input 122 into a specific anti-noise response signature.

An output bus 124 of anti-noise memory 114 may feed at least one anti-noise generator 128 upon IC chip 108. In one example, anti-noise memory 114 may feed multiple anti-noise generators 128 that may be distributed across IC chip 108. In another example, suppression system 100 may include an anti-noise generator in each quadrant of IC chip 108, as shown in FIG. 1. By way of example, suppression system 100 of FIG. 1 shows an anti-noise generator 128a, 128b, 128c, and 128d in a first, second, third, and fourth quadrant, respectively, of IC chip 108.

Depending on the expected location on IC chip 108 of noise generation due to the execution of the received IC event, bus 124 directs an anti-noise response signature from anti-noise memory 114 for the impending noise event to the appropriate one or more anti-noise generators 128 in the expected location(s). In response to the anti-noise response signature of anti-noise memory 114, a certain anti-noise generator 128 may release a charge of a certain amplitude and duration and at a certain time (e.g., a certain clock cycle) to the P/S network, in order to substantially cancel the effects of the expected noise event upon the P/S network. More details of an example anti-noise generator are described with reference to FIG. 2.

The set of anti-noise response signatures that are stored within anti-noise memory 114, which are associated with a set of expected noise events, may be determined at a variety of times with respect to IC 108. Examples of storage times for one or more of the anti-noise response signatures for anti-noise memory 114 include, but are not limited to, at the time of design of IC chip 108, at the time of simulation of IC chip 108, at the time of building IC chip 108, at a time of operation of IC chip 108 (e.g., in response to sensed actual noise on IC chip 108), at initial startup of IC chip 108 (e.g., sample IC events could be run at first use of the chip, corresponding noise sensed, and anti-noise signatures created for storage in an anti-noise memory). In one example, one or more anti-noise signatures of the anti-noise signatures stored within anti-noise memory 114 are predetermined, during the design and simulation phase of the IC chip. In another example, the contents of anti-noise memory 114 may be loaded with the predetermined set of anti-noise response signatures and no further updating of anti-noise memory 114 occurs. In yet another example, the contents of anti-noise memory 114 may be loaded initially with a certain value for one or more anti-noise response signatures, such as loaded with the predetermined set of anti-noise response signatures or loaded with all zeros, and, subsequently, the contents of anti-noise memory 114 may be updated based on actual and real time noise measurements (e.g., providing adaptive noise suppression). The delivery time of the anti-noise response signatures to coincide with their respective noise events may be controlled, for example, by pipelining (pipeline not shown) output bus 124 of anti-noise memory 114 of FIG. 1.

In one example of a system 100 that includes updateable anti-noise signatures, suppression system 100 may optionally include at least one noise sensor 132. Alternatively, system 100 may optionally include multiple noise sensors 132 that may be distributed across IC chip 108. In one example, suppression system 100 includes a noise sensor 132 in each quadrant of IC chip 108, as shown in FIG. 1. By way of example, suppression system 100 of FIG. 1 shows a noise sensor 132a, 132b, 132c, and 132d in a first, second, third, and fourth quadrant, respectively, of IC chip 108. As noise events execute upon IC chip 108, the P/S network may be monitored via the one or more noise sensors 132. More details of an example noise sensor are described with reference to FIG. 4.

The strength, duration, and time of each noise event of a certain portion of, for example, P/S 110 may be measured via one of noise sensors 132. A noise updater 140 utilizes information from a noise sensor 132 to generate an anti-noise response signature appropriate for suppressing a noise event. Noise updater 140 may include an anti-noise response (ANR) algorithm 136 for using noise measurements from a noise sensor to calculate an anti-noise response signature for an anti-noise response therefore. Noise updater 140 may include write/read control logic for anti-noise memory 114. Noise updater 140 may access anti-noise memory 114 to update and/or add one or more anti-noise response signatures in anti-noise memory 114. In one example, noise updater 140 may write a new anti-noise response signature to a storage location of anti-noise memory 114. An entry of the storage location of anti-noise memory 114 and the input sequence associated with the IC event that produced the anti-noise response signature are placed in look-up memory 118. In another example, noise updater 140 may generate an updated anti-noise signature for an IC event for which an anti-noise signature is already stored in anti-noise memory 114. In such an example, the previously stored and executed anti-noise signature may have not produced an anti-noise response that fully counteracted the noise associated with the execution of the corresponding IC event. Noise updater 140 utilizes noise information measured by noise sensor 132 to generate an update to the anti-noise signature of anti-noise memory 114.

In the example shown in FIG. 1, one or more noise sensors 132 and noise updater 140 are on IC chip 108. In an alternative implementation, a noise-sensing mechanism, ANR algorithm, and/or noise updater logic may reside off-chip, i.e., outside of IC chip 108.

Figure 2:
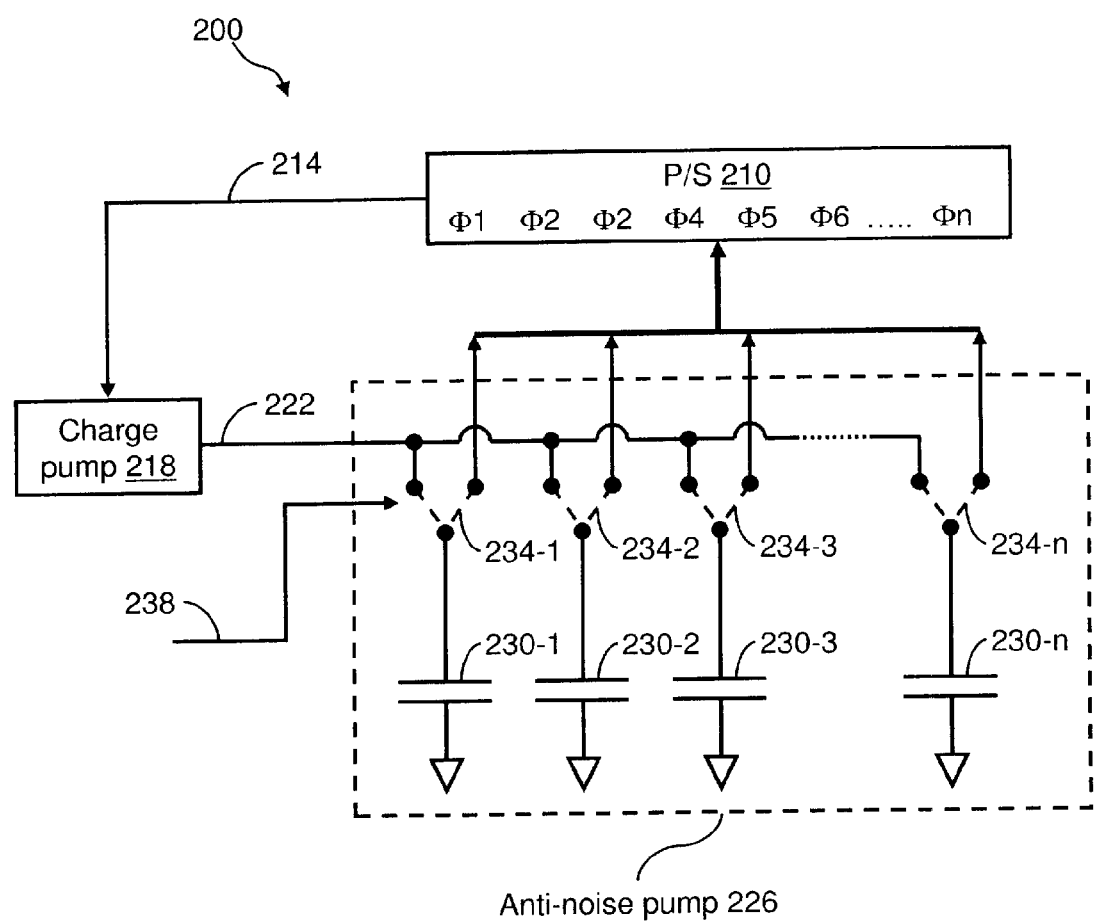
FIG. 2 illustrates a high-level block diagram of an example of an anti-noise generating circuit.

FIG. 2 illustrates a high-level block diagram of an example of an anti-noise generator 200 for releasing a charge into a power supply network, such as a P/S 210, in order to cancel noise thereon. P/S 210 may be, for example, a Vdd or Vcc P/S network of an integrated circuit and provides an output voltage 214 that feeds a charge pump 218. Charge pump 218 may be any charge pump circuit for receiving a direct current (DC) input voltage and generating a multiple thereof at its output. In one example, charge pump 218 may be a voltage-doubler circuit and, thus, for example, when output voltage 214 of P/S 210 may be about 1 volt, an output voltage 222 of charge pump 218 may be about 2 volts. The output voltage 222 of charge pump 218 may be connected to an anti-noise pump 226 that may include one or more charge storing elements, such as one or more capacitors 230, for storing the charge that is supplied by charge pump 218. In one example, anti-noise pump 226 may include a set of capacitors 230-1 through 230-n.

Under the control of an electronic switch 234, each respective capacitor 230 may be electrically connected to output voltage 222 of charge pump 218 in order to charge the respective capacitor 230 to, for example, but not limited to, about 2×Vdd volts. Alternatively, each respective capacitor 230 may be electrically connected to P/S 210 in order to release a charge of, for example, but not limited to, about 2×Vdd volts from the respective capacitor 230 to P/S 210. In one example, each electronic switch 234 includes a transistor circuit that is controlled via one or more control signals 238. Control signals 238 may be derived according to the anti-noise response signatures of an anti-noise memory. In one example, control signals 238 may be output bus 124 of anti-noise memory 114 of FIG. 1.

In one embodiment, during a predetermined quiet portion of the cycle, when the P/S network does not need a noise-canceling charge to be released thereto, a certain one or more of capacitors 230-1 through 230-n may be charged by being connected to output voltage 222 of charge pump 218 via a certain respective one or more switches 234-1 through 234-n. In one exemplary aspect, charging an anti-noise generator at times when a power supply network is inactive and storing the charge may diminish the current demand placed on the power supply and mitigate the impact (e.g., inductive voltage drop) of a suppression system and/or method on the power supply. During a noise event, a pre-calculated noise-canceling charge may be released to the P/S network, such as P/S 210, via a certain one or more (depending on the amount of charge required) of capacitors 230-1 through 230-n, which may be discharged to P/S 210 via a certain respective one or more switches 234-1 through 234-n. The time at which the charge may be released by anti-noise pump 226 may be determined by control signals 238, such that charge may be released at one or more phases (φ), such as phases 1 through n (φ1 through φn). In one example, this discharge of a certain one or more of capacitors 230-1 through 230-n to P/S 210 is timed to coincide with the noise event. The delivery time of the charge releases to P/S 210 to coincide with its respective noise event may be controlled, for example, by pipelining (pipeline not shown) control signals 238. Exemplary noise-canceling action of an anti-noise generator, such as anti-noise generator 200, is illustrated with reference to FIGS. 3 and 4.

Figure 3:
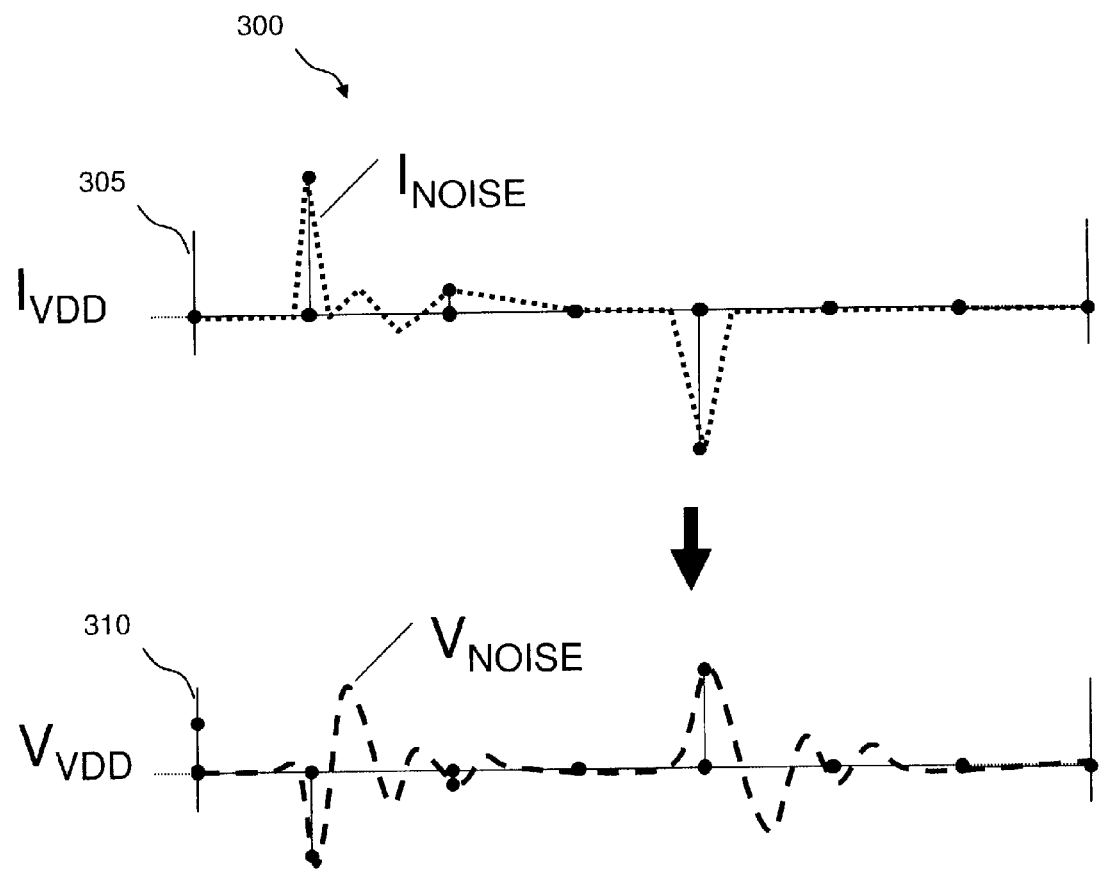
FIG. 3 illustrates a set of plots depicting exemplary noise on a power supply.

FIG. 3 illustrates exemplary plots 300 of one example of noise that may be generated on a power supply of an IC circuit. Plots 300 include a current plot 305 showing a current noise curve with noise ($I_{NOISE}$) fluctuating above and below an average current on an example VDD power supply. Plots 300 also includes a voltage plot 310 showing a voltage noise curve with noise ($V_{NOISE}$) fluctuating above and below an average voltage on the example VDD power supply. The voltage of the voltage curve in plot 310 corresponds to the current of the current curve in plot 305. Plots 305 and 310 illustrate the impact of noise (e.g., caused in response to a particular IC event on an IC circuit) on current and voltage of power supply VDD in this example. Using a noise suppression system and method as disclosed herein, the example IC event that causes the noise in power supply VDD can be detected prior to execution in the corresponding circuitry of the integrated circuit. Using a look-up memory in conjunction with an anti-noise memory, an anti-noise suppression signature can be determined quickly and submitted to an anti-noise generator in the vicinity of the IC chip in which the IC event will execute and cause the noise on the power supply. Timely and proactive delivery of an anti-noise response corresponding to the anti-noise signature to the power supply can counteract (e.g., in part or in whole) the noise that will be generated by the IC event.

Figure 4:
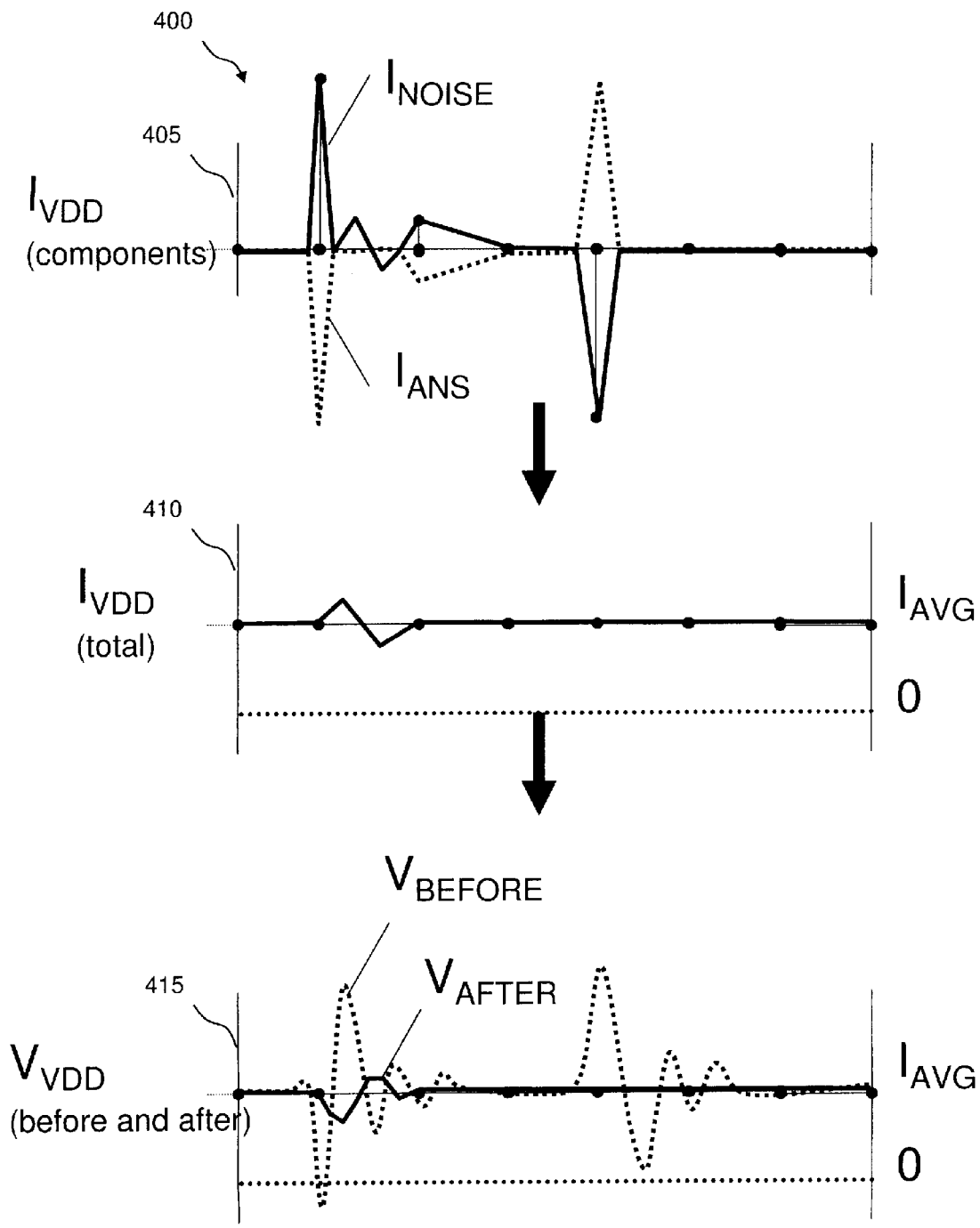
FIG. 4 illustrates a set of plots depicting an exemplary implementation of a noise suppression system with respect to the example noise illustrated in FIG. 3.

FIG. 4 illustrates exemplary plots 400 of one implementation of active noise suppression of the noise from the example discussed with respect to FIG. 3. In response to receiving an input sequence representing an IC event that will be executed by one or more elements of an integrated circuit, a look-up memory (e.g., memory 118 of FIG. 1) rapidly correlates the input sequence with a location in an anti-noise memory (e.g., memory 114) of an anti-noise response signature. The anti-noise response signature includes (and/or is associated with) information that indicates the location on the integrated circuit where the IC event will be executed. The anti-noise signature is communicated to an anti-noise generator (e.g., generator 128) with a connection in the vicinity of the location. The anti-noise generator produces an anti-noise response to the exemplary VDD power supply at about the same time as the execution of the IC event in that location. Plots 400 includes a overlay current plot 405 showing a current noise curve ($I_{NOISE}$) on the exemplary VDD power supply. This current noise curve is shown as a solid line. Plot 405 also shows a proactive anti-noise response current curve ($I_{ANS}$) delivered to VDD as part of an adaptive noise suppression system and/or method as disclosed herein. This anti-noise response current curve is shown as a broken line. As can be seen by plot 405, the anti-noise response signal is configured to offset the noise signal on the power supply. Plot 410 illustrates the resultant current ($I_{VDD}$(total)) on the exemplary VDD power supply as a result of delivering the proactive anti-noise response ($I_{ANS}$) at about the same time as the execution of the IC event and production of current noise ($I_{NOISE}$). In this example, the noise in current on the power supply VDD is significantly suppressed. As will be discussed further below, the remaining noise may be sensed and used to modify the anti-noise signature in the anti-noise memory for the corresponding IC event to more effectively counteract the noise that is generated by the IC event. FIG. 4 also shows a plot 415 that illustrates the corresponding voltage without the use of the anti-noise response ($V_{BEFORE}$) and the voltage with the use of the anti-noise response ($V_{AFTER}$), in this example. The voltage on the exemplary VDD power supply without noise suppression is shown as a broken line. The voltage on the exemplary VDD power supply with noise suppression is shown as a solid curve. Each is shown with respect to the average current ($I_{AVG}$) of the power supply. Plot 415 illustrates that the noise in voltage on a power supply can be significantly reduced by the use of a system and/or method of active noise suppression as disclosed herein.

Figure 5:
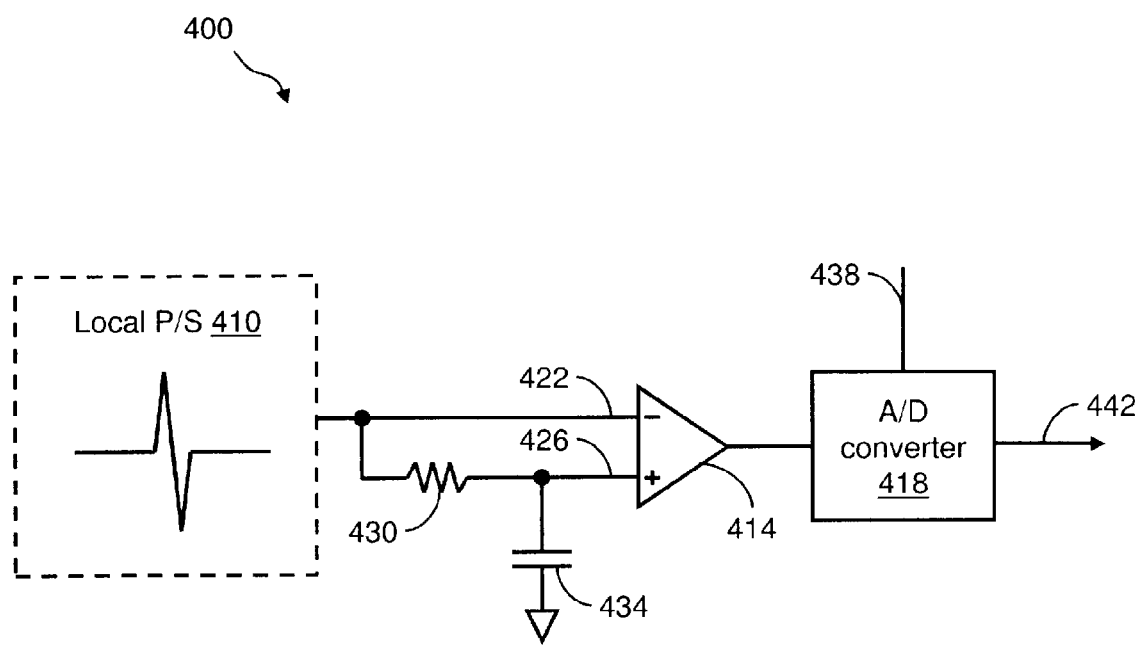
FIG. 5 illustrates a high-level block diagram of an example of a noise sensor.

FIG. 5 illustrates a high-level block diagram of an example of a noise sensor 500 for determining the P/S network noise that is associated with a certain IC chip operation. A local P/S 510 of noise sensor 500 may be sampled by use of, for example, a differential amplifier 514 and an analog-to-digital (A/D) converter 518. More specifically, a first input 522 of differential amplifier 514 may be electrically connected to local P/S 510 and a second input 526 of differential amplifier 514 may be electrically connected to an RC low-pass filter that may be formed by a resistor 530 and a capacitor 534, as shown in FIG. 5. The RC low-pass filter filters the actual supply noise of local P/S 510 and produces an average supply value of local P/S 510. An output of differential amplifier 514 may be electrically connected to A/D converter 518, which may be, for example, a 3-bit A/D converter device, performs a standard operation of converting an analog voltage to a digital voltage. A/D converter 518 may have one or more sampling inputs 538.

By use of noise sensor 500, the actual value of local P/S 510 may be sampled at a pre-determined portion of a cycle and compared via differential amplifier 514 against an average value of local P/S 510 that is produced by the RC low-pass filter. The difference between the actual value of local P/S 510 and the average value of local P/S 510 is provided at the output of differential amplifier 514 and may be quantified via A/D converter 518. An output 542 of A/D converter 518 provides an anti-noise response signature that may be transmitted to, for example, noise updater 140 of noise suppression system 100. The noise sampling of a noise sensor, such as noise sensor 500, may be performed at multiple sample times that may be defined by sampling inputs 538. Multiple noise sensors, such as noise sensors 132 of FIG. 1, may be used in parallel or, alternatively, each execution cycle may be divided into sections and each section may have an anti-noise weight.

Referring again to FIGS. 1, 2, and 5, an exemplary operation of noise suppression system 100 may be as follows. The combination of anti-noise memory 114 and look-up memory 118 of ANRL module 112 translates the input sequence that is detected via event input 122 into unique anti-noise response signatures and routes these anti-noise response signatures to the appropriate anti-noise generator 128. Each input sequence of event input 122 triggers an anti-noise response in order to counter the noise produced by its execution. More specifically, when the input sequence reaches execution stage the appropriate anti-noise generator 128 delivers the pre-determined amount of anti-noise, at a pre-determined time, in order to cancel out the chip noise at the appropriate location upon the IC chip, such as IC chip 108. A noise sampling circuit, such as noise sensors 132 or noise sensor 500, may optionally provide noise information to a mechanism, such as ANR algorithm 136 of noise updater 140, for adaptively modifying the anti-noise response signature that is stored, for example, in anti-noise memory 114, in order to best counter a specific noise event associated with a particular input sequence.

An anti-noise generator, such as one of anti-noise generators 128, utilizes the anti-noise response signature in order to generate the appropriate anti-noise response, as each input sequence maps to a specific anti-noise response. Each input sequence of event input 122 may be a function of an input op-code, input data, along with other environmental variables, such as but not limited to, power supply and temperature variations. Op-code sequences that have similar anti-noise response signatures may be combined to increase the hit rate of look-up memory 118, which may be a TCAM. At a specific time the anti-noise generator, such as one of anti-noise generators 128, releases a binary anti-noise response, which optionally may be weighted. The anti-noise generator stores charge during the quiet times of the cycle and release charge during the noise times. In doing so, the current demand on the P/S network may be substantially flattened out and inductive voltage drop may be substantially eliminated. Optionally, in order to populate or update the anti-noise response signature that is associated with a specific input sequence, a local P/S network, such as P/S 110 of FIG. 1 or local P/S 510 of FIG. 5, may be sampled and its noise signature may be fed back to, for example, ANR algorithm 136 of noise updater 140 and saved in, for example, anti-noise memory 114. The first time the sequence is executed, the input sequence and the anti-noise parameters are saved in, for example, anti-noise memory 114. However, when the sequence already resides in anti-noise memory 114, the residual noise may be quantified and used to update (e.g., add to or subtract from) the previously stored anti-noise response signatures. Thus, a noise sampling block, such as noise sensors 132 of FIG. 1 or noise sensor 500 of FIG. 5, may provide the information necessary for adaptive noise suppression.

In another embodiment, a noise suppression system (e.g., system 100) may launch and execute expected IC event sequences in order to maintain up-to-date anti-noise response signatures. Circuit elements capable of submitting one or more expected IC event sequences to the integrated circuit for execution may be associated with a system as disclosed herein. Such circuit elements may include, but are not limited to, a circuit element for detecting an idle time of the integrated circuit (e.g., learning may occur during an idle time), a circuit element for generating an expected IC event, a circuit element for storing expected IC event sequences, and any combinations thereof. The expected event sequences may be executed by the integrated circuit, the resultant noise measured, and an anti-noise response signature created or updated based on this "learning" procedure. In one example, an expected event sequence is executed by an integrated circuit where the particular expected event sequence does not yet have a corresponding anti-noise response signature and the resultant noise is utilized to produce an initial anti-noise response signature that is stored in an anti-noise memory with a corresponding entry in a look-up memory. In another example, an expected event sequence is executed by an integrated circuit where the executed event sequence has a prior corresponding anti-noise response signature in an anti-noise memory. In such an example, the resultant noise (if any) is utilized to modify the anti-noise response signature. During such a "learning" operation, the final results may be gated and the cycle time may be reduced until a fail occurs. Upon a fail, the anti-noise response signatures may be varied until a set of patterns pass. Then the stored anti-noise response signatures may be updated.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A noise suppression method for a power supply network of an integrated circuit capable of executing one or more IC event sequences, the method comprising:
   receiving a first IC event sequence to a CAM memory element;
   correlating the first IC event sequence to a storage location in a second memory element, the storage location including an anti-noise response signature, said correlating occurring in about one clock cycle or less of the integrated circuit;
   outputting the anti-noise response signature; and
   utilizing the anti-noise response signature to generate an anti-noise response in a power supply network in at least a portion of the integrated circuit at about the time of execution of the first IC event sequence.

2. A method according to claim 1, further comprising:
   measuring resultant noise generated by the execution of the first IC event sequence, the resultant noise corresponding to noise remaining after generation of the anti-noise response; and
   adaptively updating the anti-noise response signature based on the resultant noise.

3. A method according to claim 2, wherein said measuring resultant noise includes:
   sampling the power supply at about the time of execution of the first IC event sequence and the generation of the anti-noise response; and
   referencing the sampled voltage against an average voltage of the power supply to determine the resultant noise.

4. A method according to claim 1, further comprising:
   generating an expected IC event sequence;
   measuring resultant noise generated by the execution of the expected IC event sequence;
   updating an existing anti-noise response signature of the second memory element corresponding to the expected IC event sequence or creating a new anti-noise response signature in the second memory element corresponding to the expected IC event sequence.

5. A method according to claim 1, further comprising storing charge from the power supply network over time prior to execution of the first IC event by the integrated circuit, wherein said utilizing the anti-noise response signature to generate an anti-noise response includes applying the stored charge in an amount and at a time in response to the anti-noise response signature.

6. A method according to claim 1, further comprising pipelining the anti-noise response signature to properly time the generation of the anti-noise response with the execution of the IC event sequence.

7. A noise suppression system for a power supply network of an integrated circuit capable of executing one or more IC event sequences, the noise suppression system comprising:
   an integrated circuit event input for receiving a first IC event sequence to the integrated circuit;
   a first memory having one or more storage locations, each of said one or more storage locations configured to store a corresponding respective one of a first set of anti-noise response signatures, each of the first set of anti-noise response signatures corresponding to an anti-noise response associated with at least one of the one or more IC event sequences;
   a second memory configured to store a second set of correlations between the one or more IC event sequences and said one or more storage locations, said second memory being in communication with said integrated circuit event input for receiving the first IC event sequence and searching said second set of correlations for a first location of said one or more storage locations that includes a first anti-noise response signature corresponding to the first IC event sequence, said first memory using the first location to output the first anti-noise response signature; and
   an anti-noise generator in communication with said first memory for receiving the first anti-noise response signature from said first memory, said anti-noise generator generating an anti-noise response from the first anti-noise response signature in at least a portion of the power supply network at about the same time of execution of the first IC event sequence by the integrated circuit.

8. A noise suppression system according to claim 6, wherein said second memory includes a content addressable memory.

9. A noise suppression system according to claim 8, wherein said content addressable memory is a ternary content addressable memory.

10. A noise suppression system according to claim 6, wherein said first memory includes a random access memory.

11. A noise suppression system according to claim 6, further comprising:
   a noise updater in communication with said first memory;
   a noise sensing element in communication with said noise updater for detecting a first noise signature on at least a portion of the power supply network, the first noise signature corresponding to an execution of a second IC event sequence, and communicating the first noise signature to said noise updater for initial storage and/or updating of said first memory.

12. A noise suppression system according to claim 6, wherein said anti-noise generator comprises:
   a charge storage device;
   a charge pump for transferring charge from at least a portion of the power supply network to said charge storage device in response to said first anti-noise response signature.

13. A noise suppression system according to claim 6, wherein said anti-noise generator comprises:
   a charge storage device;
   an anti-noise pump for transferring charge from said charge storage device to at least a portion of the power supply network in response to said first anti-noise response signature.

14. A noise suppression system for a power supply network of an integrated circuit capable of executing one or more IC event sequences, the noise suppression system comprising:
   an integrated circuit event input for receiving a first IC event sequence to the integrated circuit;
   a first memory having one or more storage locations, each of said one or more storage locations configured to store a corresponding respective one of a first set of anti-noise response signatures, each of the first set of anti-noise response signatures corresponding to an anti-noise response associated with at least one of the one or more IC event sequences;
   a second memory including a set of correlations between the one or more IC event sequences and said one or more storage locations, said second memory capable of receiving said first IC event sequence and outputting to said first memory an indication of a first storage location of said one or more storage locations that corresponds to the first IC event sequence, said outputting occurring within a predetermined number of clock cycles of the integrated circuit from the receiving of first IC event sequence by said first memory; and
   an anti-noise generator in communication with said first memory for receiving a first anti-noise response signature from said first memory, the first anti-noise response signature associated with said first storage location, said anti-noise generator generating an anti-noise response from the first anti-noise response signature in at least a portion of the power supply network at about the same time of execution of the first IC event sequence by the integrated circuit.

15. A noise suppression system according to claim 13, wherein said second memory includes a content addressable memory.

16. A noise suppression system according to claim 14, wherein said content addressable memory is a ternary content addressable memory.

17. A noise suppression system according to claim 13 wherein said first memory includes a random access memory.

18. A noise suppression system according to claim 13, further comprising:
   a noise updater in communication with said first memory;
   a noise sensing element in communication with said noise updater for detecting a first noise signature on at least a portion of the power supply network, the first noise signature corresponding to an execution of a second IC event sequence, and communicating the first noise signature to said noise updater for initial storage and/or updating of said first memory.

19. A noise suppression system according to claim 13, wherein said anti-noise generator comprises:
   a charge storage device;
   a charge pump for transferring charge from at least a portion of the power supply network to said charge storage device in response to said first anti-noise response signature.

20. A noise suppression system according to claim 13, wherein said anti-noise generator comprises:
   a charge storage device;
   an anti-noise pump for transferring charge from said charge storage device to at least a portion of the power supply network in response to said first anti-noise response signature.

* * * * *